Aug. 9, 1960  V. J. GILBERT  2,948,527
GARTER SPRING CONSTRICTION RESTRICTOR
Filed April 24, 1959  2 Sheets-Sheet 1
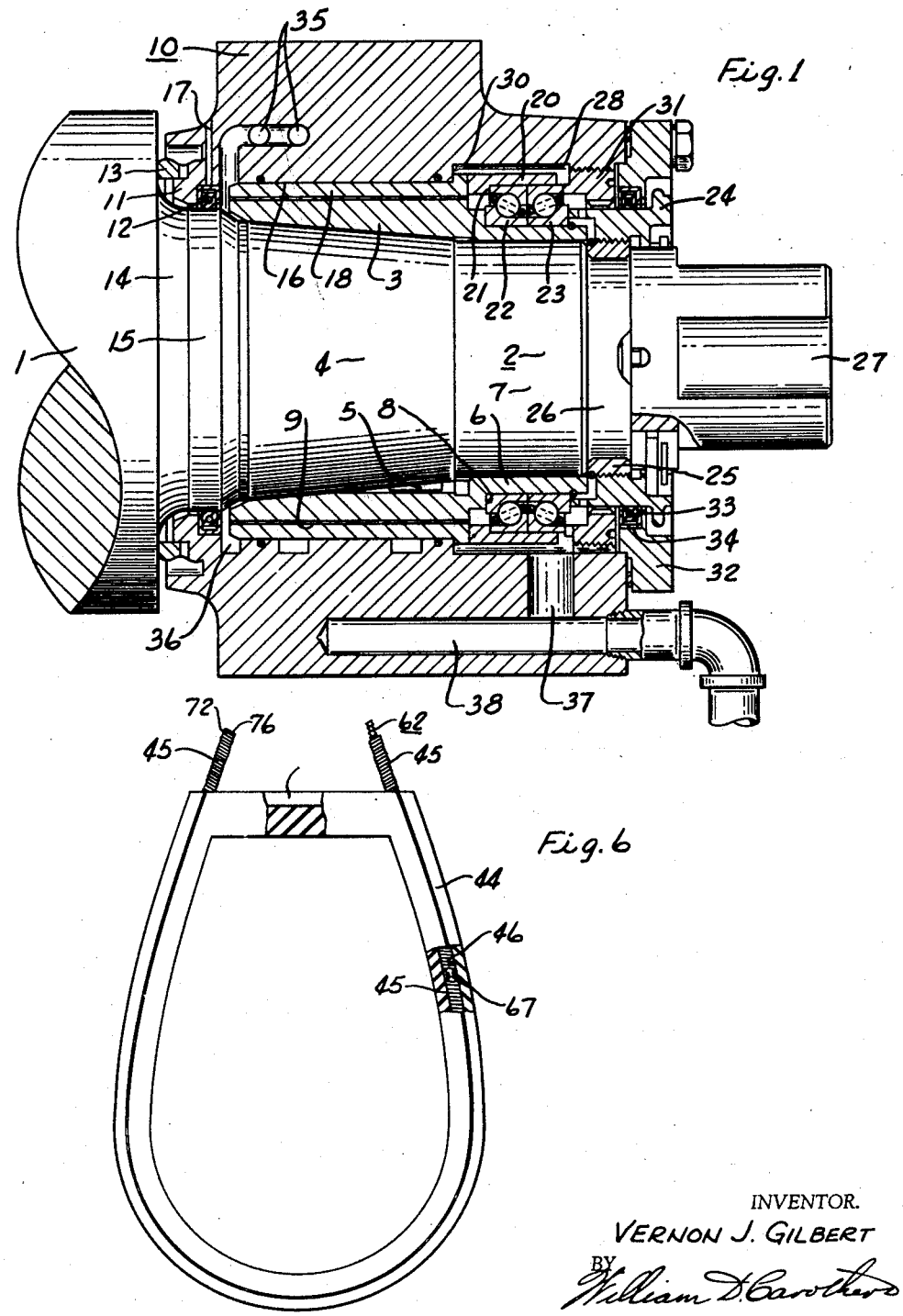
INVENTOR.
VERNON J. GILBERT
BY
HIS ATTORNEY Aug. 9, 1960 V. J. GILBERT 2,948,527
GARTER SPRING CONSTRICTION RESTRICTOR
Filed April 24, 1959 2 Sheets-Sheet 2
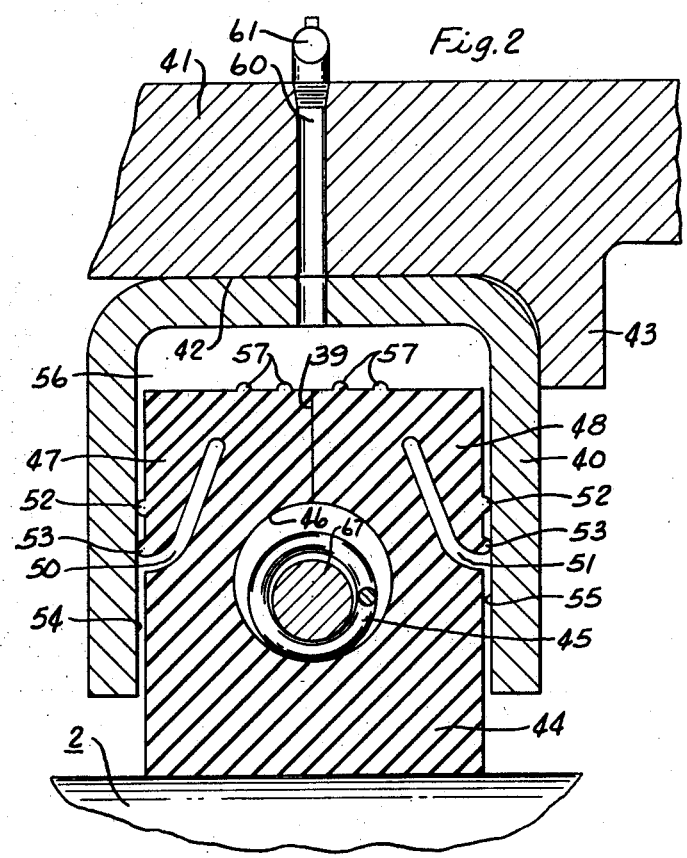
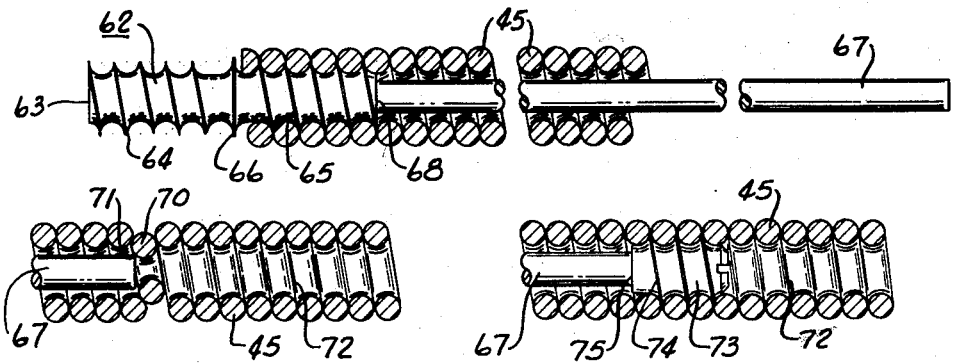
INVENTOR.
VERNON J. GILBERT
BY
HIS ATTORNEY

United States Patent Office 2,948,527
Patented Aug. 9, 1960

2,948,527

GARTER SPRING CONSTRICTION RESTRICTOR

Vernon J. Gilbert, Indiana, Pa., assignor to Syntron Company, Homer City, Pa., a corporation of Delaware Filed Apr. 24, 1959, Ser. No. 808,719

3 Claims. (Cl. 267—1)

This invention relates generally to garter springs for shaft seals and more particularly to a connector and a construction restrictor for such garter springs.

Garter springs are used extensively to hold annular elastomer sealing members in sealing relation on rotary members such as propeller shafts, roll necks and the like. These garter seals are generally constructed of helical coils which are inserted in annular chambers of the elastomer seal members and the ends of the coil are either hooked together or one is inserted into the other for the purpose of exerting a radial pressure on the elastomer against the annular member which it engages. If the elastomer is very large in cross section in comparison to the diameter of the shaft little difficulty is encountered in applying such an elastomer shield to the shaft. On the other hand, the seal may be relatively small in cross section as compared to the diameter of the member that is being sealed such as a large propeller shaft or a roll neck which supports a roll in single or multiple stands in a rolling mill. In structures of this character, the garter spring is required to be sufficiently tight for the purpose of holding the elastomer tight against the large diameter of the roll neck and it is exceedingly difficult to prevent the elastomer from twisting and rolling over its own axis while forcing it into place. Frequently, the elastomer seal member is ruined in attempting to mount it into place and at times it has been attempted to employ a spreader to hold the elastomer with its garter spring intact and expanded while placing it on the shaft. Here again the elastomer may be twisted or turned within its seal housing while being applied.

This problem has been overcome by the present invention wherein the garter spring is provided with a connector that may be threadably engaged in the opposite ends of the springs to form the circular garter and at least one end of this connector is employed as an abutment for a construction restrictor in the form of a rod or wire that will readily slide in the helical garter spring before being closed and engage one end of the connector and while so positioned the garter spring is stretched and expanded so as to be longer than the construction restrictor and is then looped around and twisted so that it may be threadably engaged on the other end of the connector, thus enclosing the construction restrictor within the circular garter spring and limiting the constriction of the garter spring. When the garter spring is mounted with this constriction restrictor while passing through the elastomer seal member, it thus functions to restrict and hold the diameter of the elastomer to a minimum size which is preferably only a little smaller than the diameter of the seat on which it is to be applied. Thus with the elastomer being held to a materially larger diameter than that as compared with an elastomer garter spring not having a constriction restrictor, the elastomer may be readily forced on the shaft without causing the elastomer to roll or otherwise become injured while being installed. Frequently, large diameter elastomer seals having a garter spring with a constriction restrictor can be inserted in place by hand and without fear of injuring the surface of the elastomer seal or the seal chamber in which it is housed.

Another advantage of this invention is the provision of a simplified and more reliable connector for attaching the ends of a section of a garter spring in abutting relation to each other.

Another object is the provision of another abutment applied to the garter spring in spaced relation from the connector for entrapping a constriction restrictor in the garter spring prior to its insertion in an elastomer seal member. Such other abutment may be in the form of a deformed turn in the helical coil making up the garter spring or it may be in the form of an independent screw in threadable engagement with the bore of the garter spring.

Another object is the provision of the method of assembling a garter spring within an annular elastomer and containing a constriction restrictor and having its ends threadably engaging a common connector by providing a short radial slit in the elastomer in a nongripping, nonsealing face of the elastomer permitting it to be opened up to thread the garter spring therethrough, then to provide adequate space to connect the ends of the garter spring together so that they may be slipped down into operative position within the elastomer seal member.

Other objects and advantages appear hereinafter in the following description and claims.

The accompanying drawings show for the purpose of exemplification without limiting the invention or claims thereto certain practical embodiments of this invention wherein:

Fig. 1 is a sectional view showing a roll neck journaled within a roll neck bearing housing and two seals mounted therein.

Fig. 2 is an enlarged cross-sectional view of the seal member mounted within an annular seal housing which in turn is mounted in sealed relation within the bearing housing.

Fig. 3 is an enlarged sectional view of a garter spring in its unstretched condition and containing a screw type spring connector in one end and a constriction restrictor projecting from its other end.

Fig. 4 is an enlarged sectional view of one end of the garter spring having a second abutment in the form of an indented turn in the helical spring retaining the constriction restrictor within the garter spring.

Fig. 5 is an enlarged sectional view of one end of the garter spring having a second abutment in the form of a screw sitting the helical bore of the garter spring to retain the constriction restrictor within the garter spring.

Fig. 6 is a view partly in section of the elastomer seal inserted within the spring chamber of the elastomer seal member and about to have its ends secured together by a connector to complete the annular garter spring.

Referring to Fig. 1 the roll 1 is provided with a roll neck 2 at either end thereof, only one end being shown, which roll neck has mounted thereon a sleeve member 3 made to fit the tapered section 4 of the roll neck and keyed therewith by the key member 5. The outer end of the sleeve 3 is provided with a cylindrical section 6 that fits the cylindrical section 7 on the roll neck. The cylindrical section 6 providing an outer annular step 8 between its outer cylindrical surface and that cylindrical portion 9 which is concentric with the tapered section of the sleeve.

The roll neck housing as indicated at 10 has an inner annular projection 11 bored from the interior thereof to receive the inner seal member 12. The outer portion of the projection 11 is threaded to receive a ring 13 that substantially engages the end face of the roll 1 for the purpose of keeping large foreign particles from entering around the fillet 14 immediately adjacent the roll. Outwardly from the fillet 14 is a cylindrical surface 15 on which the seal member 12 functions.

The bore 16 of the housing 10 is larger than the small bore that receives the inner seal member 12 to permit the latter to be inserted through the housing and pressed into position as shown. A passageway such as indicated at 17 may be employed to add a heavy or semifluid grease to the sealing chamber through a suitable lubricating fixture not shown in Fig. 1.

The large bore 16 also receives the cadmium plated bushing 18 which functions as the sleeve bearing and has journaled therein the outer cylindrical surface 9 of the sleeve 3. The bushing 18 is likewise provided with an extension as indicated at 20 and which corresponds with the cylindrical extension 6 on the sleeve 3 being provided with the step 21. A pair of roller bearings 22 and 23 having races of opposite pitch are provided between the cylindrical surfaces 6 and 20 with their inner ends abutting the shoulders 8 and 21 respectively. The inner race of the bearing 23 is engaged by the inner end of the ring 24 which is threadably received on the exterior threaded split ring 25 mounted in the groove 26 of the roll neck 2. Thus by tightening the sleeve 24 on the threads of the ring 25 the thrust of the inner race 23 works against the thrust surface of the outer race of the bearing 23 which in turn forces the outer race of the bearing 22 against the shoulder 21. Thus the ring 24 rotates and becomes a part of the roll neck 2. The outer end of the roll neck 2 is provided with the drivehead 27.

An enlarged bore 28 is provided in the outer end of the housing 10 providing clearance for the bushing 18 and its cylindrical portion 20 which ends in a shoulder 30 for transmitting the force tending to move the roll to the left directly to the bearing housing 10. The outer end of the bore 28 is threaded to receive the lock ring 31 which abuts against the outer race of the bearing 23 which in turn receives the lateral forces on the roll towards the right from the shoulder 8 to the inner race of the bearing 22 through the ball bearing to the outer race shoulder of the bearing 22 and thence to the outer race of the bearing 23 to the ring 31. This ring may be backed up with shims by the head 32. However, none are shown. The head 32 is bolted to the end of the housing 10 and provides a bore in which the second seal member 33 is inserted by a force fit against the shoulder 34.

The lubricant which is principally oil is circulated through the passageways indicated at 35 until it enters the annular chamber 36 from thence it is forced under pressure of approximately fourteen pounds through the bearing between the cadmium bushing 18 and the sleeve 3 laterally requiring that the oil provide the actual support of the weight and pressure load on the roll. The oil being forced through this long bearing, then must pass through the roller bearings 22 and 23 to the chamber 37 where it is discharged to the longitudinal chamber 38 and out a discharge pipe from whence it is collected, recleaned, cooled and reconditioned for circulation through the system. Thus the seals 12 and 33 which are similar in size and structure retain the lubricant pressure within the bearing system. These seals are illustrated in Fig. 2 wherein the annular seal housing 40 which is preferably made of brass or bronze is nothing but an annular ring and it is forced by pressure into the housing such as illustrated at 41 which may be either the housing 10 or the ring 32. In any event the annular sealing housing 40 is forced with pressure into the surface 42 against the shoulder 43 which fit is sufficient to retain the fourteen to twenty pounds lubricant pressure and nothing is needed to safeguard the annular seal chamber 40 from moving out of its pressed shape as it would be engaged by either the bushing 18 or the ring 31 and could do no harm.

The body of the seal is formed by the natural or synthetic rubber or elastomer member indicated at 44 in Fig. 2 which is preferably extruded in straight form and is cut to length and then vulcanized so as to provide a continuous annular seal ring. A large diameter elastomer member is slit vertically along the line 39 as shown in Fig. 2 for three inches to enable the garter spring 45 to be inserted into the bore 46 of the elastomer body 44 and extended therearound coming out the other end as illustrated in Fig. 6.

The seal 44 has on its opposite sides two annular flange members 47 and 48 which are formed by this extrusion. These flanges when free normally extend outwardly providing the chambers 50 and 51 within the rectangular dimension of the seal body 44. However when the seal body 44 is inserted in the annular housing 40 the sides of the seal body 44 have clearance with the sides of the annular seal housing 40. Two parallel ridges 52 and 53 are provided on each flange and engage and seal with their corresponding inner faces 54 and 55 of the annular flanges on the seal housing 40, thus providing an annular seal chamber 56 which is sealed by both of the annular ridges 52 and 53 on each side of the seal body 44. The flanges 47 and 48 are at all times pressing outwardly owing to the manner in which the body member 44 was extruded. However, any pressure that accumulates on either side may readily flow up into the space 50 or 51 and increase the pressure of the seal of the annular ridges 52 and 53 against their respective sealing surfaces 54 and 55.

The flanges of the seal housing providing the sealing surfaces 54 and 55 that enclose the annular chamber 56 are spaced from the cylindrical surface 15 of the roll neck 2 such that any lateral movement of the roll neck, of which there is considerable, permits the seal to move up and down or laterally of the seal housing 40 without interrupting or otherwise breaking the seal. This factor together with the fact that only two ridges 52 and 53 on each flange performs the sealing function permits this seal to operate at very high speeds even though the diameter of the seal is comparatively large and still maintains good sealing characteristics.

The outer perimetral surface of the body 44 is provided with the annular ridges 57. These ridges prevent the chamber 56 from ever becoming completely eliminated at one point of the seal if such a condition would be conceivable. However, under practice the spacing of the chamber 56 is adequate to prevent the necessity of the annular ridges 57.

A passageway 60 leading into the annular chamber 56 through the housing 41 is provided with a check valve grease fixture 61 for the purpose of aiding the semifluid grease or heavy cup grease to the chamber 56. This grease when supplied under pressure will force out any dirt that may have attempted to pass into the chamber 56 and will at all times maintain the annular radial surfaces 54 and 55 properly lubricated for the annular sealing ridges 52 and 53.

As shown in Fig. 3 the garter spring 45 is provided with the connector 62 which is in the form of a stem 63 having the threads 64 and 65 on opposite sides of an abutment 66. The threads 64 and 65 are shaped to fit and be complementary to the bore of the helical spring 45. The abutment 66 is materially greater in diameter than the threads 64 and 65 and is likewise shaped to fit the end of the helical spring as illustrated in Fig. 3 but is not as large in diameter as the garter spring 45.

When the connector 62 is inserted in one end of the garter spring 45 until the end of the garter spring 45 engages the abutment 66, a constriction restrictor such as indicated at 67, which is longer than the helical spring 45 when not stretched, is inserted into the garter spring 45 until it abuts the end of the connector as indicated at 68. Thus the constriction restrictor is always made longer than the garter spring when unextended and when assembling the free end opposite that which contains the spring connector 62, is stretched until it extends beyond the end of the constriction restrictor 67 as shown in Fig. 4 at which time one turn of the garter spring 45 is deformed as indicated at 70 to produce an abutment 71 thereby enclosing the constriction restrictor 67 within the garter spring and leaving a sufficient number of turns as indicated at 72 in the garter spring 45 to receive the opposite end of the connector 62 as illustrated in Fig. 4.

The abutment 71 of Fig. 4 may be replaced by means of the screw 73 as shown in Fig. 5. This screw is provided with a thread 74 that is complementary to the bore of the helical spring 45 and when the spring 45 is extended and the screw 73 inserted therein it provides the abutment 75 to retain the end of the constriction restrictor 67 leaving a sufficient number of turns on the end of the spring 45 to receive the opposite end of the connector 62.

Referring now to Fig. 6 the spring 45 which contains the constriction restrictor 67 and is extended to the proper degree as illustrated in either Fig. 4 or 5 is then threaded through the central bore 46 of the elastomer element 44 by passing the same through the slot 39 and down one side of the elastomer 44 and around and up the other side of the elastomer until it extends out of the other side of the slot 39 as indicated in Fig. 6.

When the garter spring with its preloaded constriction restrictor has been thus threaded through the elastomer 44, the connector 62 is held from rotation and the opposite end 76 is rotated in the direction opposite to that of the threads or the twist of the helix and for a sufficient number of turns so that when the end 63 of the connector 62 is inserted in the open bore 72 of the garter spring 45 and the latter is released, the spring will wind itself over the thread 64 until it engages the abutment 66 and thereby interlocks the ends of the garter spring together. The interlocked ends are then fed down through the slit 59 until they repose within the central bore 46 providing a circular elastomer element which is prevented from getting any smaller in diameter than the length of the constriction restrictor. The original length of the garter spring 45 and the original length of the constriction restrictor 67 are selected so that when the latter is inserted in the former and the spring connected as described it will produce a circle that provides a sufficient radial gripping power on the elastomer to properly engage and seal on the cylindrical surface 15 of the roll neck 2. However, it will prevent the elastomer from getting too small so that it is possible to insert the elastomer in position by hand. There is sufficient clearance between the diameter of the constriction restrictor and the bore of the helical spring 45 to permit proper restriction of the garter spring without reducing the pressure required to make the proper seal between the elastomer and the shaft that it grips.

I claim:

1. A garter spring structure comprising a section helical garter spring of predetermined length, a connector to fit the bore of said garter spring, the ends of said garter spring secured to said connector and forming an abutment, a second abutment in said garter spring inwardly of one end of said connector, and a constriction restrictor in the form of a wire section in the bore of said garter spring and longer than the unstretched length of said garter spring, the ends of said constriction restrictor engaging said second abutment and one end of said connector to restrict the constriction of said garter spring but free of said second abutment to permit expansion of said garter spring to a diameter greater than the length of said wire section.

2. The structure of claim 1 characterized in that said second abutment is an indented turn in said helical garter spring inwardly of the other end of said connector.

3. The structure of claim 1 characterized in that said second abutment is a screw threadably engaging the interior of said garter spring inwardly of the other end of said connector.

References Cited in the file of this patent

UNITED STATES PATENTS

| | | |
|---|---|---|
| 735,731 | Draver | Aug. 11, 1903 |
| 1,264,193 | Leonard | Apr. 30, 1918 |
| 1,271,014 | Bower | July 2, 1918 |
| 2,070,638 | McCombs | Feb. 16, 1937 |